United States Patent [19]

Eriksson et al.

[11] Patent Number: 4,594,543
[45] Date of Patent: Jun. 10, 1986

[54] LIGHTNING WARNING SYSTEM

[75] Inventors: Andrew J. Eriksson, Midrand; Patrick C. Kuhn, Pretoria, both of South Africa

[73] Assignee: South African Inventions Development Corporation, Pretoria, South Africa

[21] Appl. No.: 549,599

[22] Filed: Nov. 7, 1983

[30] Foreign Application Priority Data

Nov. 16, 1982 [ZA] South Africa ............ 82/8422

[51] Int. Cl.⁴ ............................................. G01N 31/02
[52] U.S. Cl. ..................................... 324/72; 324/77 R
[58] Field of Search ................... 324/77 R, 72, 72.5; 73/170 R, 170 A; 340/601

[56] References Cited

U.S. PATENT DOCUMENTS 3,465,245  9/1969  Fischer ............................ 324/72
3,611,365  10/1971 Lundquist ........................ 324/72
4,395,906  8/1983  Ryan .............................. 324/72

Primary Examiner—Michael J. Tokar
Attorney, Agent, or Firm—Ladas & Parry

[57] ABSTRACT

An apparatus and method for warning against lightning strikes, in which the rate of occurrence of ground flashes is determined and used as a criterion. The rate of occurrence of ground flashes in 0 to 5 kilometers, 5 to 10 kilometers and 10 to 20 kilometers is determined. In addition, the field intensity is used as a criterion. A series of time windows is generated, each time window starting when a ground flash occurs, and the number of flashes occurring in each time window is counted to determine the rate of occurrence. A criterion selection matrix is provided to select various criteria in different combinations to provide different alarm levels.

9 Claims, 3 Drawing Figures

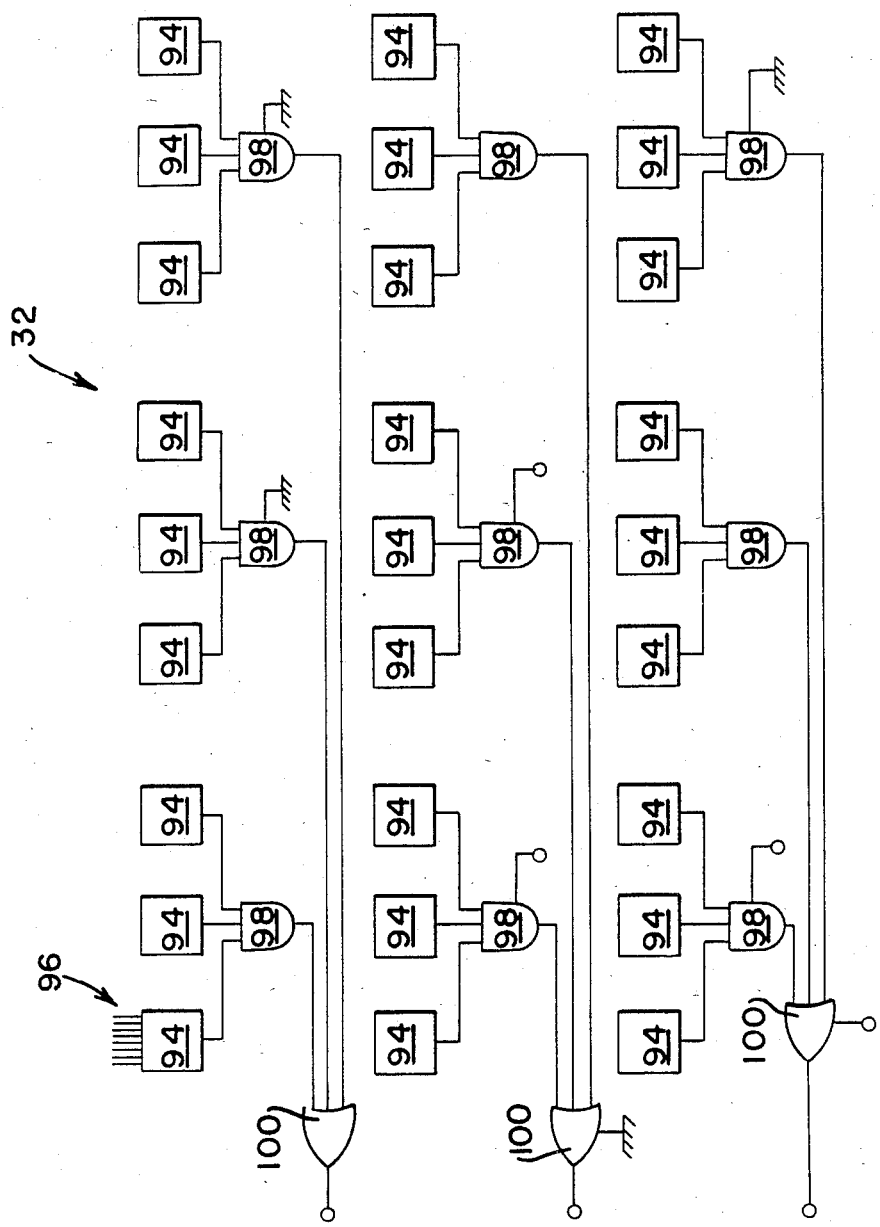

LIGHTNING WARNING SYSTEM

BACKGROUND OF THE INVENTION

This invention relates to an apparatus and method for warning against lightning.

Many industrial situations and processes are susceptible to catastrophic damage in the event of direct lightning strikes typically, explosive factories and certain mining operations, or the handling and storage of flammable fuels or ammunitions. In such situations there is often a need to suspend vulnerable operations or processes while a thunderstorm is in the immediate vicinity. In order to optimise safety and to minimise the disruption of whatever process is involved, a warning system capable of providing reliable notice of an imminent hazard is therefore required. It is, however, essential that spurious or unnecessarily prolonged alarms be avoided.

SUMMARY OF THE INVENTION

The invention accordingly provides an apparatus for warning against lightning strikes, which includes a rate determining means for determining the rate of occurrence of ground flashes in the vicinity of the apparatus; and a level detecting means responsive to the rate determining means for providing a level signal if the rate detected by the rate determining means exceeds a predetermined value.

Further according to the invention there is provided a method for warning against lightning strikes in a particular region, which includes determining the rate of occurrence of ground flashes in the vicinity of the region; and detecting if the rate exceeds a predetermined value.

The rate determining means may determine the rate of occurrence of ground flashes within a predetermined radial distance of the apparatus. Preferably, the apparatus includes a lightning ground flash sensing means for supplying a flash signal each time that a ground flash occurs. The lightning ground flash sensing means may be sensitive to a distance range for sensing the occurrence of a ground flash at a distance therefrom which is within the said range and for supplying a flash signal each time a ground flash occurs within the said range. These ranges may typically be zero to five kilometers, five to ten kilometers and ten to twenty kilometers.

The apparatus may thus have a number of rate and level determining means, one for each distance range.

Still further, the apparatus may be adapted to be responsive to a high and a low rate of ground flashes. Thus, for each distance range there may be two rate determining means and two level detecting means, one set to respond to a high rate and the other to a low rate.

The rate at which the ground flashes occur may be monitored by counting the number of ground flashes within a predetermined time window. Thus, if a predetermined number of counts is counted within the time window, the level signal is supplied indicating that the rate has exceeded the predetermined value.

It will be appreciated by those skilled in the art that the time window will need to move in time. This can be done continuously, with a set predetermined period between the start of one window and the start of the next window, or with a random variation between the beginning of each window. It is preferred that the beginning of each window occurs when a lightning strike occurs, which will occur randomly. Thus, a first window will be initiated upon the occurrence of a first ground flash, and the number of ground flashes occurring in that window will be counted. Similarly, upon the occurrence of a second ground flash, a second window will be initiated and the ground flashes occurring within that window will be counted.

The apparatus may also have a field intensity detector adapted to supply a further signal when the field intensity exceeds predetermined values.

Those skilled in the art will also appreciate that the various parameters can be selected in a number of desired ways to provide alarms. Further, it is preferred that there be a number of alarm levels depending on the possibility or probability of a lightning strike occurring in the immediate vicinity of the apparatus. The different alarm levels may each be audible, with different alarm tones at different repetition rates; to give a sense of increasing urgency. Thus, the apparatus may include a logic network which may be user-programmable to select the various combinations of the various parameters and the alarms that are generated when the various combinations occur.

BRIEF DESCRIPTION OF THE DRAWINGS

The invention is now described, by way of an example, with reference to the accompanying drawings, in which:

FIG. 3 shows a circuit diagram of the user-programmable logic network forming part of the device.

DESCRIPTION OF THE PREFERRED EMBODIMENT

Figure 1:
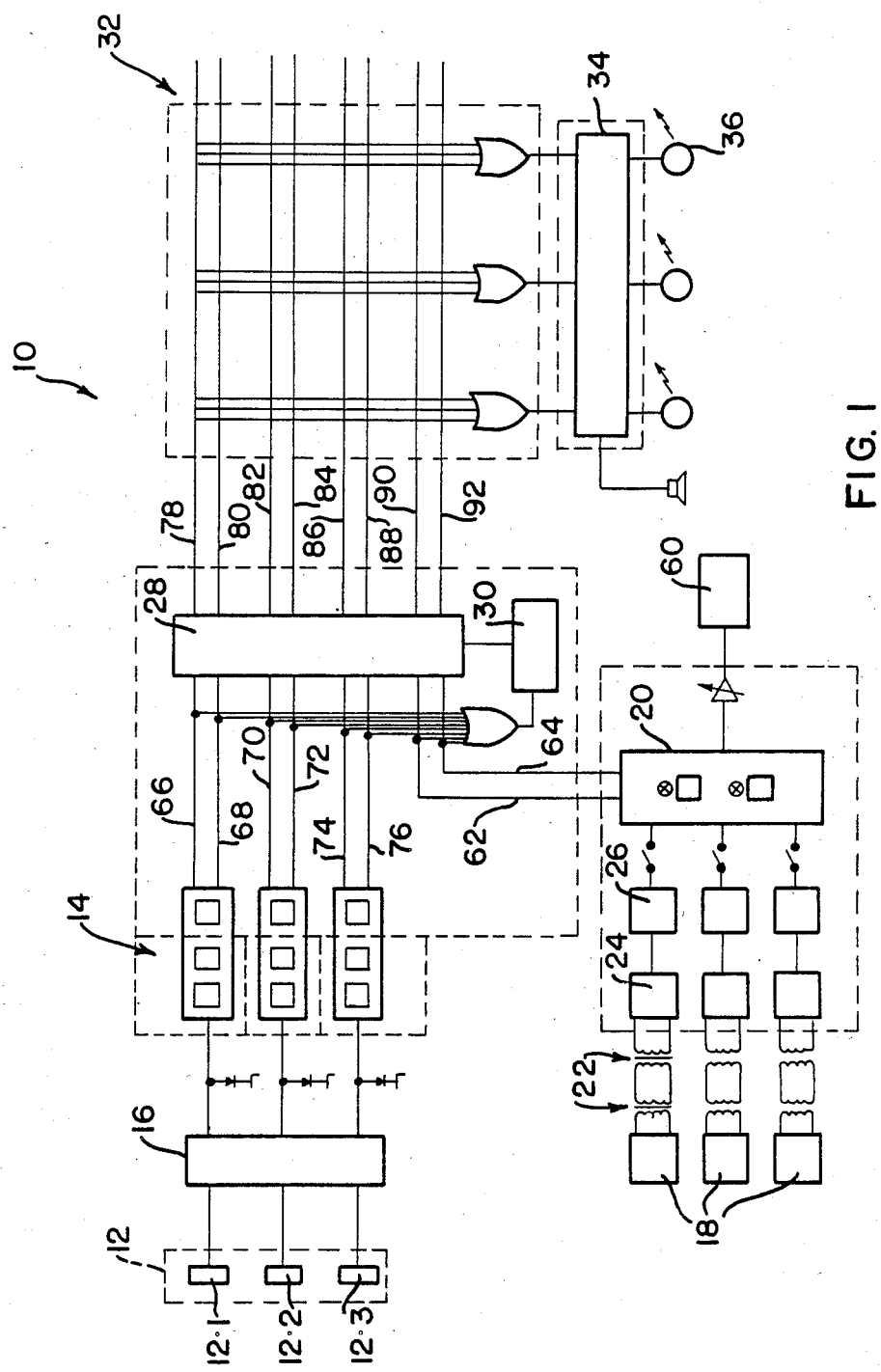
FIG. 1 shows a circuit diagram illustrating generally a lightning warning apparatus in accordance with the invention.

Referring to FIG. 1, shown therein generally by reference numeral 10 is an apparatus for warning against lightning strikes. The apparatus 10 includes an ground flash counter 12 connected to a rate counting module 14 via opto-isolators 16. The apparatus 10 also has field strength meters 18 connected to a field strength threshold detector unit 20 via coupling transformers 22, frequency to voltage converters 24 and filters 26. Further, the apparatus 10 has a latch 28, a master clock 30, a decision matrix unit 32, an alarm generator 34 and alarm transducers 36.

The flash counter 12 has three modules 12.1, 12.2 and 12.3 for detecting lightning ground flashes within effective ranges of twenty kilometers, ten kilometers and five kilometers from the particular area at which warning of lightning danger is to be given. The signals supplied by the ground flash counter 12 are supplied to six rate counting modules, there being two rate counting modules for each range, one being set to detect a high rate level and the other being set to detect a low rate level.

Figure 2:
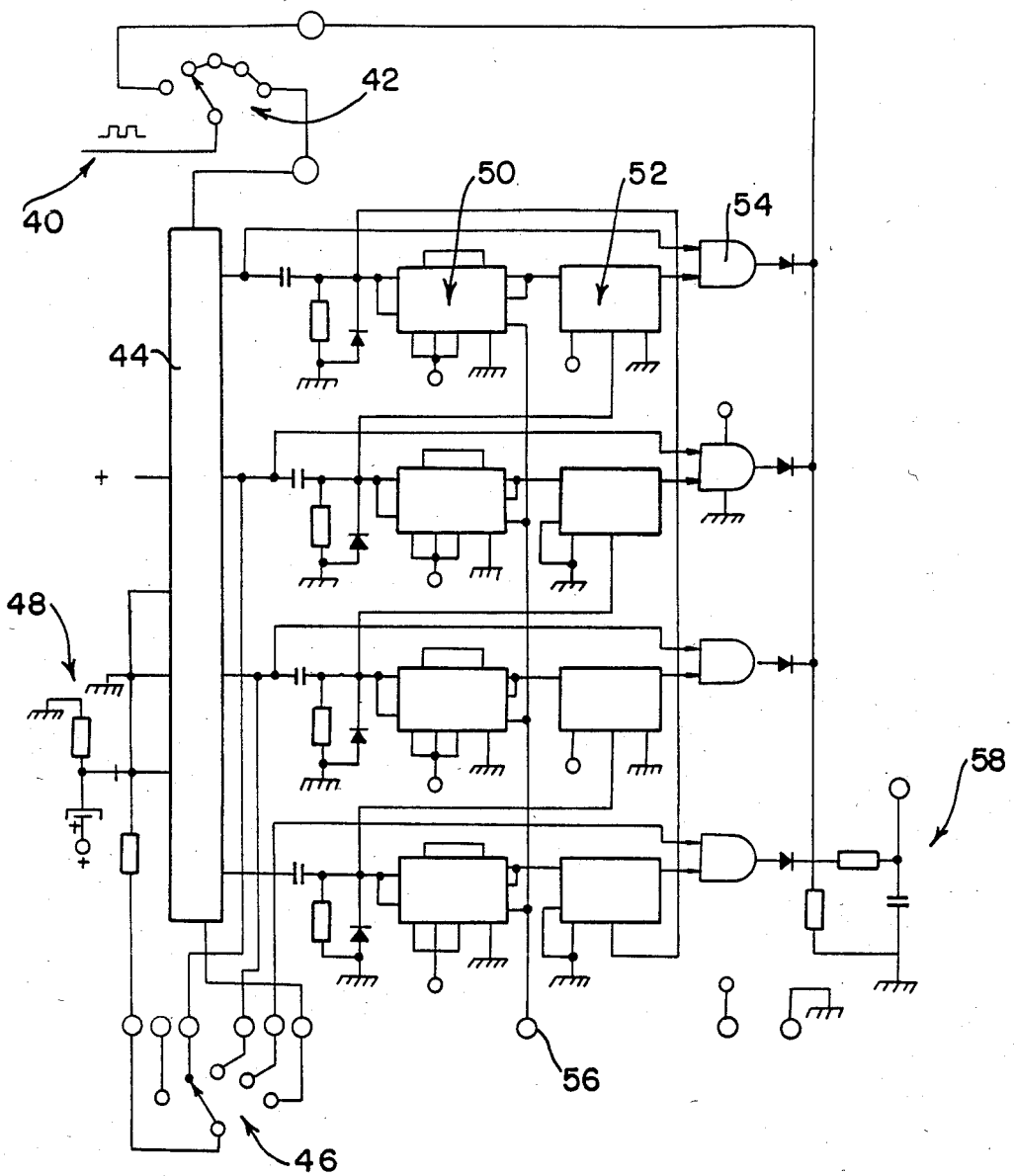
FIG. 2 shows a circuit diagram of one of the rate determining and monitoring units of the device.

An example of one of the rate counting modules is shown in FIG. 2. The rate counting module is designated by reference number 38.

Signals representative of lightning ground flashes are supplied via an input line 40 to a by-pass switch 42. If the switch 42 is set in its by-pass configuration, the module 38 will supply an output pulse for every input pulse. In its normal, non-by-pass, configuration, the number of input pulses occurring during a predetermined time duration are counted, and if the count exceeds a predetermined value only then is an output signal given. Thus, the module 18 also has a ring counter 44 driven by signals supplied from the by-pass switch 42 with each of the stages of the ring counter having a timer and logic network as is explained below. The number of operative stages of the ring counter 44 may be varied by means of a stage setting switch 46. The ring counter 44 is further reset when power is applied to the apparatus, by means of a reset circuit 48.

Each stage of the ring counter 44 has a "60" counter 50, a flip flop 52 and an "AND" gate 54. The counters 50 are supplied with timing signals (that are operator variable) and are connected to the reset terminals of the flip flops 52. The reset circuit of each counter 50 is connected to its stage output of the ring counter 44. The outputs of the flip flops 52 and of the appropriate stage of the ring counter 44 are supplied to the "AND" gate 54 at that stage. It is further noted that the output of each stage of the ring counter 44 is connected to the set input of the flip flop 52 of the preceding stage. The clock pulses that are supplied to the counters 50 can be set to be at a frequency of one pulse per second to one pulse every ten seconds. Thus, the counters will count from zero to full count in one to ten minutes depending on the frequency of the clock signals supplied to them.

It will be understood that each time a stage of the ring counter goes high, it will reset its associated counter 50 which will then start counting the pulses supplied to it. Thus, each time a stage goes high a time window (which varies in length) is a started. At the end of each time window, each counter resets its associated flip flop 52. It will still further be appreciated that when stage two goes high it sets the flip flop 52 for stage one. It will accordingly be understood that if the flip flop 52 for stage one is still in its set mode (which will be the case if its counter 50 has not attained its full count) when stage one again goes high, the gate 54 will supply a signal. Thus, by setting the number of stages that the counter 44 has, this will in effect be setting the number of lightning ground flash counts that are to occur in the preset time interval. This is effected by means of switch 46. Thus, if switch 46 is set so that the ring counter 44 has only two stages, then an output signal will be supplied by one of the "AND" gates 54 if two lightning ground flashes occur within the predetermined time window. If the switch 46 is set so that the counter 44 has three stages, then an output signal will only be supplied if there are three lightning ground flashes within the predetermined time window.

It will further be appreciated that, as each counter 50 is reset when its associated stage goes high, a new time window is started with each lightning ground flash.

An output filter network 58 is provided to remove any short duration spikes which can occur because of race conditions as a result of propagation delays in the various components.

Referring again to FIG. 1, the field strength threshold detector 20 determines which of the three channels has the highest magnitude (either positive or negative), compares the result with preselected threshold values and then displays the peak value of the field strength via a suitable display means 60. Thus, the module 20 compares all the positive voltages with each other and passes the one with the highest amplitude and similarly compares all the negative voltages to each other and passes the one with the highest amplitude. The highest amplitude negative voltage signal is then inverted and compared with the highest amplitude positive signal. Depending on which of the two signals is larger, the appropriate larger signal is passed to the display means 60 and to a threshold comparator. The threshold comparator compares the actual maximum signal with a low and a high threshold value. Depending on whether or not the low and/or high threshold values have been exceeded, output signals are supplied via lines 62 and 64. It is also to be noted that the rate counter modules also supply signals via lines 66 to 76. These signals are supplied to the latch 28 which in turn has output lines 78 to 92 as follows:

Line 28 carries a signal if the lightning ground flash rate at the twenty kilometer radius is greater than the low threshold value;

line 80 carries a signal if the lightning ground flash rate for the twenty kilometer radius exceeds the high threshold value;

line 82 carries a signal if the lightning ground flash rate with in the ten kilometer range exceeds the low threshold value;

line 84 carries a signal if the ground flash rate within the ten kilometer radius exceeds the high threshold value;

line 86 carries a signal if the ground flash rate within the five kilometer radius exceeds its low threshold value;

line 88 carries a signal if the ground flash rate within the five kilometer radius exceeds the high threshold value for that range;

line 90 carries a signal if the field intensity within the specific region in question exceds its low threshold value; and line 92 carries a signal if the field intensity exceeds the high threshold value.

The latch 28 is an 8-bit data latch. When any of its input lines goes high, a time window (non-sliding) but adjustable from 1 to 10 minutes) is initiated. During this time any further transitions of the data lines are latched. After the time window has elapsed the data latch is reset to await further activity on the incoming data lines, at which time another time window is initiated.

These eight lines 78 to 92 are supplied to the decision matrix 32 which is shown in more detail in FIG. 3. The decision matrix 32 has twenty seven ten position switches 94 will all eight latch lines 78 to 92 being supplied to each of the switches 94, as indicated at 96. The switches 94 are divided into three groups of nine switches each, to represent three alarm levels. Each of these three groups of nine switches are subdivided into three groups of three switches each, each sub group of three switches 94 being connected to an "AND" gate 98. The three "AND" gates of each group in turn are connected to an "OR" gate 100. The outputs of the "OR" gates 100 supplied signals representative of the alarm levels. It will thus be appreciated, that the decision matrix is user-programmable and that three sets of three element combinations may be set for each alarm level. Any of these combinations, when satisfied will trigger the corresponding level of the alarm.

As the latch 28 provides latched output signals, the decision matrix 32 can react to the required combination of parameters occurring within the latch time window, and such combinations need not occur simultaneously. The judicious choice of the duration of the time window is thus an important facet in determining the efficiency of the warning apparatus.

By means of the invention an apparatus is provided that reliably supplies alarms at different levels, depending on the rate at which lightning ground flashes have occurred in the vicinity of an area that is being protected, and on the electrical field strength in the vicinity of the protected region.

We claim:

1. An apparatus for warning against lightning strikes, which includes
    a plurality of lightning ground flash sensing means each for sensing the occurrence of a ground flash at a distance that is within a predetermined range therefrom, and each for supplying a flash signal if the flash occurred within the predetermined range for that sensing means;
    a number of rate determining means each for determining the rate of occurrence of the rate signals of an associated flash sensing means; and
    a number of level detecting means, each for detecting if the rate of occurrence as determined by an associated rate determining means exceeds a predetermined value and for providing a level signal if it does, there being twice as many rate determining means and level detecting means as there are flash sensing means, with a pair of rate determining means and level detecting means associated with each flash sensing means and with one of the level detecting means of each pair for supplying a low level signal if the rate determined by its associated rate determining means exceeds a first low value and the other of each pair for supplying a high level signal if the rate determined by its associated rate determining means exceeds a second, high value.

2. An apparatus as claimed in claim 1, in which each rate determining means includes a time window generating means for generating a time window of a predetermined duration and a counting means for counting the number of ground flashes occurring during the time window.

3. An apparatus as claimed in claim 2, in which each level detecting means includes a comparator for comparing the number of counts counted by the counting means with a predetermined number and for supplying a level signal if the number of counts equals the predetermined number.

4. An apparatus as claimed in claim 2, in which the time window generating means generates a new time window after a predetermined time interval.

5. An apparatus as claimed in claim 3, in which each time window generating means generates a new time window each time its associated flash sensing means senses the occurence of a ground flash and which includes a plurality of counting means, one for each time window.

6. An apparatus as claimed in claim 1, which includes a field intensity detecting means for supplying a field signal when the field intensity exceeds a predetermined value.

7. An apparatus as claimed in claim 1, which includes a plurality of field intensity monitoring means for location at different selected positions and for supplying signals indicative of the field strengths at their locations and a threshold detecting means for detecting if the signal supplied by any one of the field intensity monitoring means exceeds a predetermined threshold value.

8. An apparatus as claimed in claim 1, which includes a selection means for selecting various desired combinations of the level detecting means and for supplying activating signals if all the level detecting means of the selected combinations supply a signal.

9. An apparatus as claimed in claim 8, which includes a plurality of alarm anunciating means, responsive to the selection means, for supplying alarm signals upon receipt of an activating signal from the selection means.

* * * * *